United States Patent
Inui et al.

(10) Patent No.: US 7,798,653 B2
(45) Date of Patent: Sep. 21, 2010

(54) PROJECTION DISPLAY AND OPTICAL APERTURE UNIT

(75) Inventors: Shinro Inui, Hachioji (JP); Hiroshi Ooshima, Fujisawa (JP); Michiyuki Yoshino, Yokohama (JP)

(73) Assignee: Hitachi Ltd., Tokyo (JP)

( * ) Notice: Subject to any disclaimer, the term of this patent is extended or adjusted under 35 U.S.C. 154(b) by 1078 days.

(21) Appl. No.: 11/501,197

(22) Filed: Aug. 9, 2006

(65) Prior Publication Data
US 2009/0174869 A1    Jul. 9, 2009

(30) Foreign Application Priority Data
Aug. 9, 2005    (JP)    ............................. 2005-230228

(51) Int. Cl.
*G03B 21/14* (2006.01)
(52) U.S. Cl. ...................................................... 353/97
(58) Field of Classification Search ............. 353/88–93, 353/97; 362/283, 284, 321; 359/233, 234, 359/236
See application file for complete search history.

(56) References Cited

U.S. PATENT DOCUMENTS

| 7,182,470 B2 * | 2/2007 | Hashimoto et al. ............ 353/97 |
| 7,185,990 B2 * | 3/2007 | Koga et al. .................... 353/97 |
| 7,344,255 B2 * | 3/2008 | Hara et al. ..................... 353/88 |
| 2004/0263801 A1 * | 12/2004 | Totani et al. .................. 353/97 |
| 2005/0219474 A1 * | 10/2005 | Hara et al. ..................... 353/88 |
| 2006/0050248 A1 * | 3/2006 | Koga et al. .................... 353/97 |

FOREIGN PATENT DOCUMENTS

| JP | 2004-362820 A | 12/2004 |
| JP | 2005-31103 A | 2/2005 |

* cited by examiner

*Primary Examiner*—Georgia Epps
*Assistant Examiner*—Danell L Owens
(74) *Attorney, Agent, or Firm*—McDermott Will & Emery LLP

(57) ABSTRACT

A gear portion meshing with the first step of a pinion gear at the side of a motor, which is a driving unit of optical aperture mechanism, is designed to be a two-gears composition of a gear portion abutting on one side surface of the channel of the pinion gear, and a gear portion abutting on the other side surface of the channel of the pinion gear.

6 Claims, 5 Drawing Sheets

PROJECTION DISPLAY AND OPTICAL APERTURE UNIT

INCORPORATION BY REFERENCE

The present application claims priority from Japanese application JP2005-230228 filed on Aug. 9, 2005, the content of which is hereby incorporated by reference into this application.

BACKGROUND OF THE INVENTION

The present invention relates to a projection display using a liquid crystal display element as image display element, forming an optical image by the liquid crystal display element in response to an image signal, and then projecting the optical image on a screen, and the like.

In a projection display, for example, such technique has been well-known as disclosed in JP-A-2005-31103, for installing an optical aperture for modulating the emitting light amount from a light source, and by controlling the light amount modulated by the optical aperture, in response to an image signal to enhance image contrast.

SUMMARY OF THE INVENTION

However, in technique disclosed in JP-A-2005-31103, the reduction of this kind of noise is not sufficiently considered.

In the case where the modulated light amount by the optical aperture is dynamically intercepted and controlled in response to a luminance signal of image input, the heat focuses at the optical aperture portion. Therefore, for parts composing the optical aperture, the use of high heat resistant material is required. In addition, the interception of light by the optical aperture is carried out by transmitting output of a motor, which is a driving unit, to a light intercepting plate which opens and closes up and down or opens and closes right and left (rotating or sliding), by means of a gear train. Therefore, the high heat resistant materials are required for the gear portion material as well. Furthermore, in the case where the light modulation is carried out by dynamically controlling open-close of the light intercepting plate by transmitting output of the motor, which is a driving unit, the knocking noise of the gear train tends to be generated, due to backlash. Concerning such noise, the reduction thereof has recently been required for a projecting display, in particular, a consumer use display.

It is an object of the present invention to suppress the operation noise of the optical aperture, which is dynamically intercepting and controlling a light flux of illuminating light in response to a luminance signal of image input, to the minimum.

A gear portion meshing with the first step of a pinion gear at the side of a motor, which is a driving unit of optical aperture mechanism, is designed to be a two piece construction composed of a gear portion abutting on one side surface of the channel of the pinion gear.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention are explained in detail by referring to drawings. In this connection, in each drawing, the same portion is attached with the same code number, and the explanation thereof is omitted after once explained elsewhere.

Figure 1:
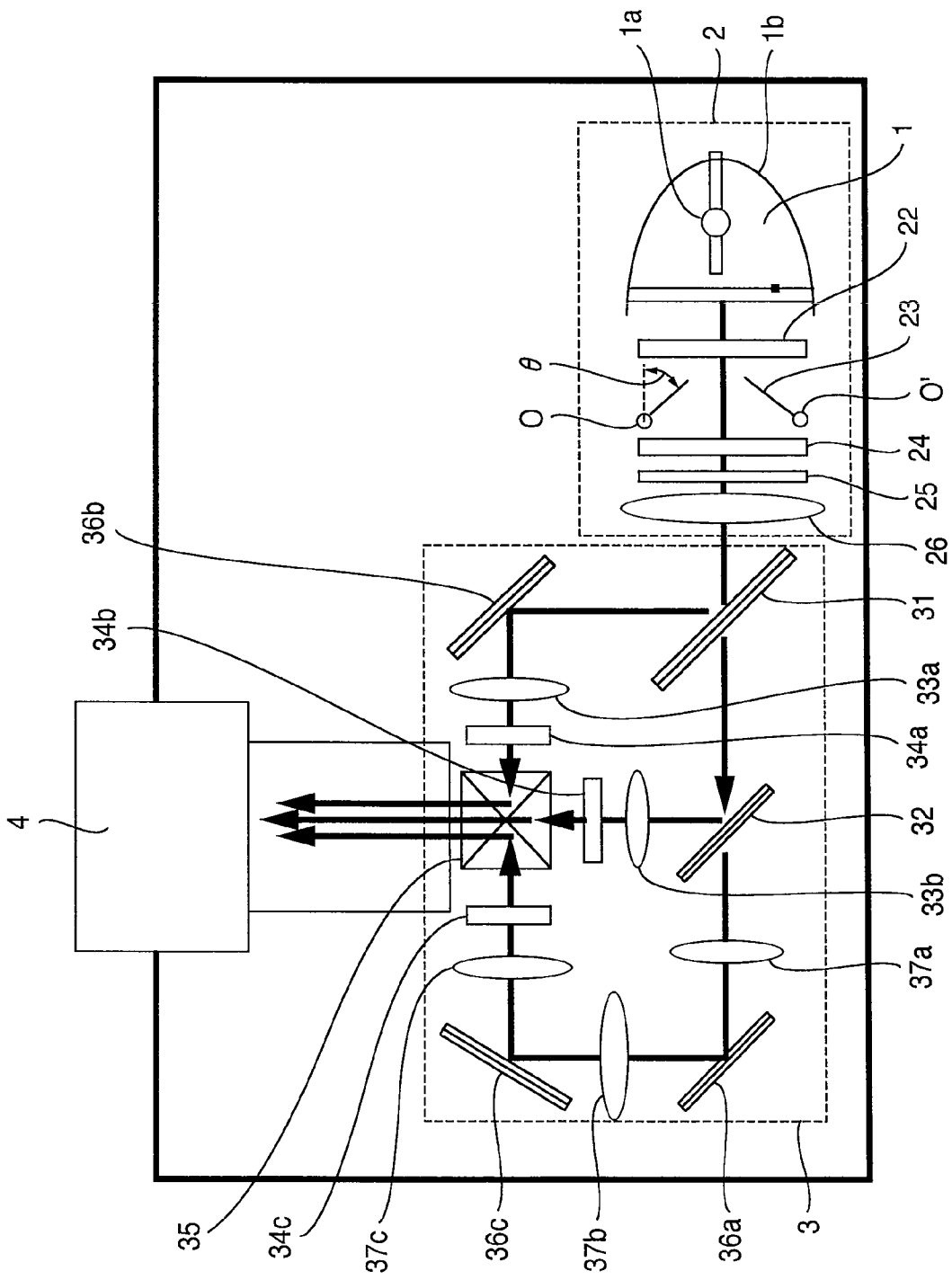
FIG. 1 is a block diagram of an optical system of a projection display according to the embodiment 1.

FIG. 1 is a plan view explaining the composition of an optical system of the inside of a projection display according to the embodiment 1. In FIG. 1, 1 is a light source, and light emitted from the light source 1 is projected on a screen by passing through the illumination optics system 2, the color separation and combination optical system 3, and the projecting lens 4.

The illumination optics system 2 is equipped with the light source 1, the first array lens 22 and the second array lens 24 as a light flux homogenization unit (namely, integrator), the optical aperture unit 23, the polarization conversion element 25 and the superimposed lens 26.

Here, the lamp 1a of the light source 1 is a white color lamp such as an very-high pressure mercury lamp, a metal halide lamp, a xenon lamp, a mercury xenon lamp and a halogen lamp, and the like. In addition, the reflecting mirror 1b for reflecting light flux from the lamp 1a has parabolic surface, therefore, light flux emitted from the light source 1 becomes parallel light.

The color separation and combination optical system 3 is equipped with the first and the second dichroic mirrors 31 and 32 for separating white color light flux to 3 color lights, the 3 mirrors 36a to 36c, the 2 condenser lenses 33a and 33b, the 3 relay lenses 37a to 37c, the 3 light bulbs 34a to 34c, and the cross dichroic prism 35.

The parallel light flux emitted from emission opening portion, after the light flux radiated from the lamp 1a is reflected at the reflecting mirror 1b, enters into the first array lens 22. The first array lens 22 separates the incident light flux into a plurality of light fluxes by a plurality of rectangular shaped lens cells installed in matrix, and introduces the incident light flux so that light fluxes pass through the second array lens 24 having a plurality of lens cells installed in matrix, similarly as the first array lens, and the polarization conversion element 25. Namely, the first array lens 22 is designed so that the lamp 1a of the light source 1 and each lens cell of the second array lens 24 are mutually in substance-image relation (conjugated relation). The second array lens 24 having a plurality of lens cells arranged in matrix, similarly as in the first array lens 22, projects the shape (rectangular shape nearly analogous to that of liquid crystal display element of the light valve 34) of the lens cell of the first array lens 22, wherein each of composing lens cell corresponds thereto, to a liquid crystal display element in the light valve 34. In this case, light from the second array lens 24 is arranged in a specified polarized light direction by the polarization conversion element 25, and thus projected image of each lens cell of the first array lens 22 is superimposed on the liquid crystal display element in the light valve 34, by each of the superimposed lens 26 and the condenser lenses 33a and 33b, and the relay lenses 37a, 37b and 37c.

Because the second array lens 24 and the superimposed lens 26 arranged adjacent thereto are designed so that the first array lens 22 and the light bulbs 34a, 34b and 34c are mutually in substance-image relation (conjugated relation), the light flux divided into plurality lights by the first array lens 22 is projected, by the second array lens 24 and the superimposed lens 26, in superimposed way on liquid crystal display element in each of the light bulbs 34, and thus is capable of providing illumination with highly homogeneous illuminance distribution in a level not posing any practical problems.

In this process, light from the illumination optics system 2 is separated into the reflecting first color light and the transmitting color light by the first dichroic mirror 31, and the transmitted color light is further separated into the reflecting second color light and the transmitting third color light by the dichroic mirror 32.

The first color light, which reflected the dichroic mirror 31, is reflected by the reflecting mirror 36b, and then by passing through the condenser lens 33a, and transmitting through the light bulb 34a, enters into the cross dichroic prism 35.

The second color light, which reflected the dichroic mirror 32, enters into the light bulbs 34b through the condenser lens 33b, and by transmitting through this light bulbs 34b, enters into the cross dichroic prism 35.

The third color light, which transmitted the dichroic mirror 32, is focused by the first relay lenses 37a, and further reflected by the reflecting mirror 36a and further focused by the second relay lenses 37b, then after reflected by the reflecting mirror 36c and further focused by the third relay lenses 37c, enters into the light bulb 34c. The light, which transmitted the light bulb 34c, enters into the cross dichroic prism 35.

Each light color, which transmitted each liquid crystal display element of the light bulb 34, after being combined as color image by the cross dichroic prism 35, passes through the projecting lens 4 and reaches at a screen not shown. Light image of each color light formed by modulation of light intensity in response to an image signal not shown, by each liquid crystal display element in each of the light bulb 34, is converted to color optical image by the cross dichroic prism 35 and projected in magnification on the screen by the projecting lens 4, and thus the function as a display is fulfilled.

The optical aperture unit 23 for modulating light from the light source 1 is arranged and installed between the first array lens 22 and the second array lens 24 of the illumination optics system 2. The optical aperture unit 23 is composed so that the turning centers O and O' freely turn to secure the position thereof at the side of the second array lens 24. In addition, light flux from the light source 1 is intercepted from the peripheral side. The amount of the light interception, namely, rotation angle θ of the optical aperture unit is controlled variably by a motor described later in response to a luminescence signal of an image signal not shown, in a control circuit not shown, to provide optimal contrast in response to image.

Then, composition of the optical aperture is explained

Figure 2:
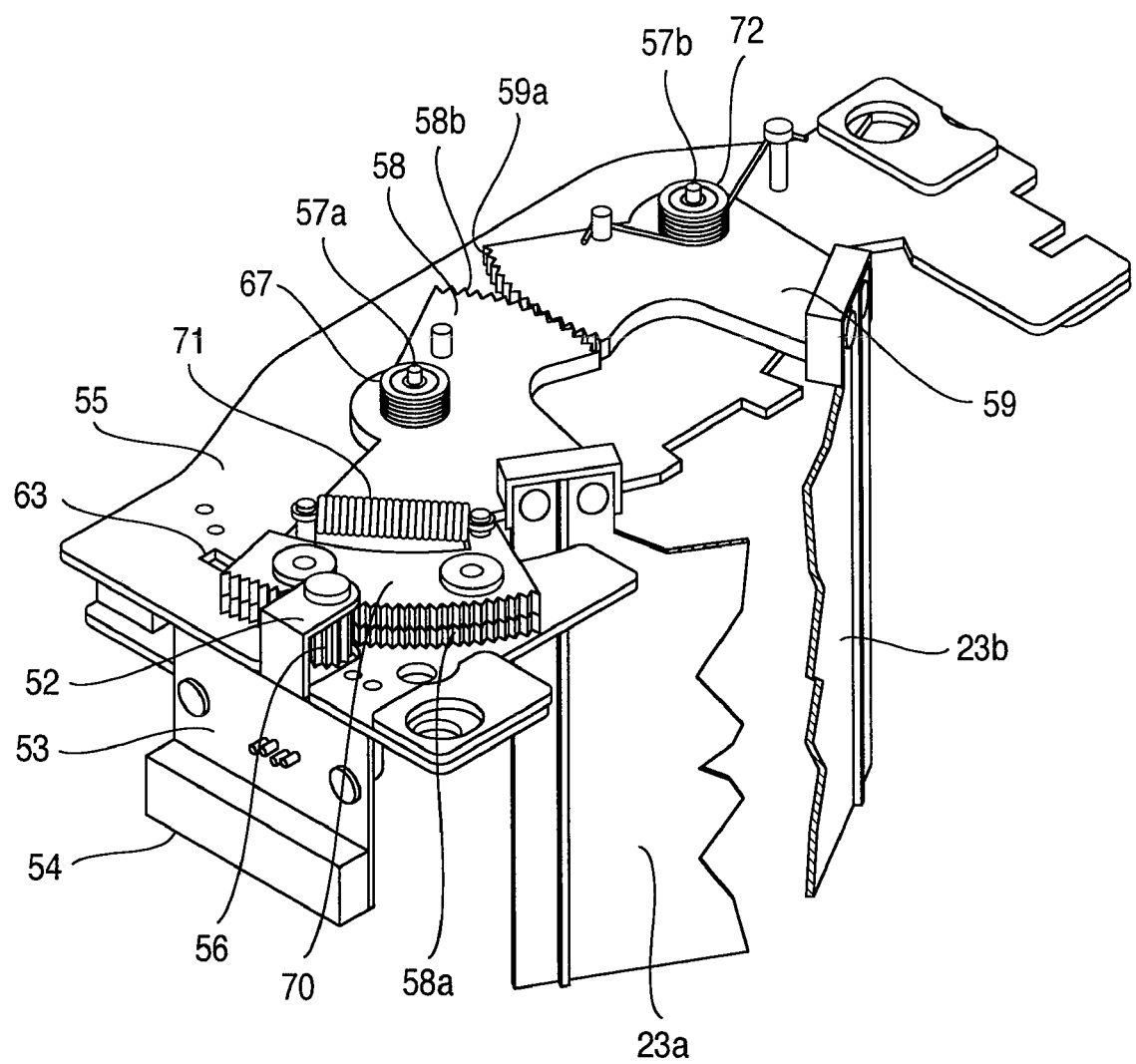
FIG. 2 is an upper perspective view explaining the mechanism of an optical aperture according to the embodiment 1.
Figure 3:
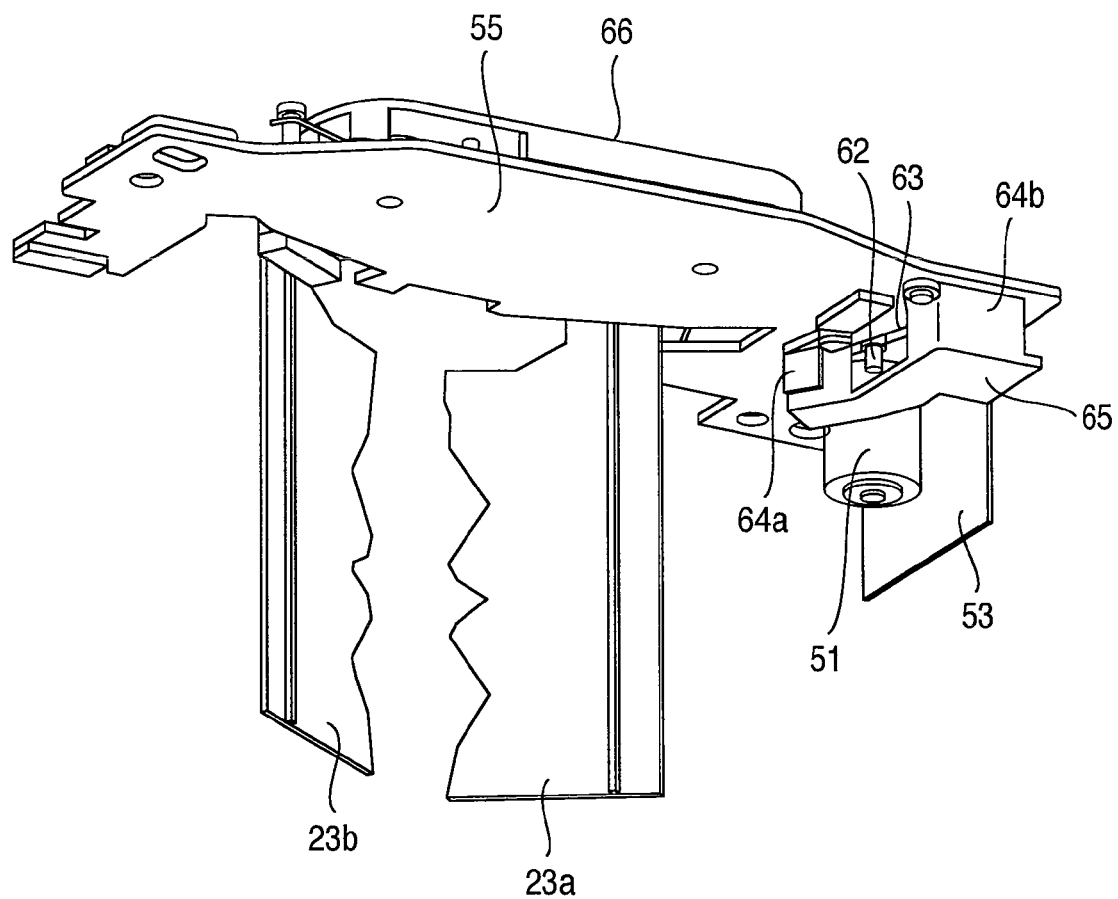
FIG. 3 is a lower perspective view explaining the mechanism of an optical aperture according to the embodiment 1.

FIG. 2 and FIG. 3 are drawings explaining mechanism of the optical aperture having the optical aperture unit 23 installed at the illumination optics system 2 according to the present Example, and FIG. 2 is an upper perspective view and FIG. 3 is a lower perspective view.

In FIGS. 2 and 3, the step motor 51, which is used as a driving unit for opening and closing the optical aperture unit 23, is equipped with the substrate 53 surface mounted with the connector 54, and the holder 52 holding the step motor 51 is engaged to the base plate 55. In addition, the motor axis of the step motor 51 is coupled with the pinion gear 56.

The based plate 55 is fixed with the shafts 57a and 57b by caulking, and engaged to the light intercepting plate base A 58 and the light intercepting plate base B 59 to secure free rotation. The light intercepting plate base A 58 is installed with the gear portions 58a and 58b, while the light intercepting plate base B 59 is installed with the gear portion 59a, and the pinion gear portion 56 meshes with the gear portion 58a of the light intercepting plate base A 58. In addition, the gear portion 58b of the light intercepting plate base A 58 meshes with the gear portion 59a of the light intercepting plate base B 59. In this connection, the gear portion 58a is arranged with the gear 70, which is described later, in superimposed way.

In addition, the compression spring 67 is attached coaxially with the turning axis of the light intercepting plate base A, and by attachment of the cover 66, the light intercepting plate base A 58 is pressed toward the base plate 55 side to reduce turning backlash.

The light intercepting plate base A58 and the light intercepting plate base B59 are installed with a screw (not shown) with the light intercepting plate A 23a and the light intercepting plate B 23b, respectively. Both of the light intercepting plates 23a and 23b have nearly symmetric shape, and provide a meshing phase of the gear portion 58b of the light intercepting plate A and the gear portion 59a of the light intercepting plate B, to secure also nearly symmetric operation of opening and closing.

At the lower surface of the light intercepting plate A 58, the protrusion 62 with convex shape is installed, and composed to secure transfer in the channel 63 formed at the base plate 55. In addition, the base plate 55 is arranged with the photo interrupters 64a and 64b along with the PI (photo interrupter) substrate 65, so that the sensing is possible at the turning end of the protrusion 62 at the channel portion 63 of the base plate 55. In this case, the turning end corresponds to full open and full closed positions of the light intercepting plate A 23a and the light intercepting plate B 23b. In addition to the above, the optical aperture mechanism is equipped with the cover 66.

The light intercepting plate A 23a and the light intercepting plate B 23b are composed to secure free turning so that the turning center thereof is positioned at the second array lens 24 side. Then, by synchronizingly opening and closing these light intercepting plate A 23a and light intercepting plate B 23b in response to an image signal, light flux of illuminating light is properly adjusted.

The turning angle of the light intercepting plate A 23a and the light intercepting plate B 23b is designed to be changed stepwise by the step motor 51.

Figure 4:
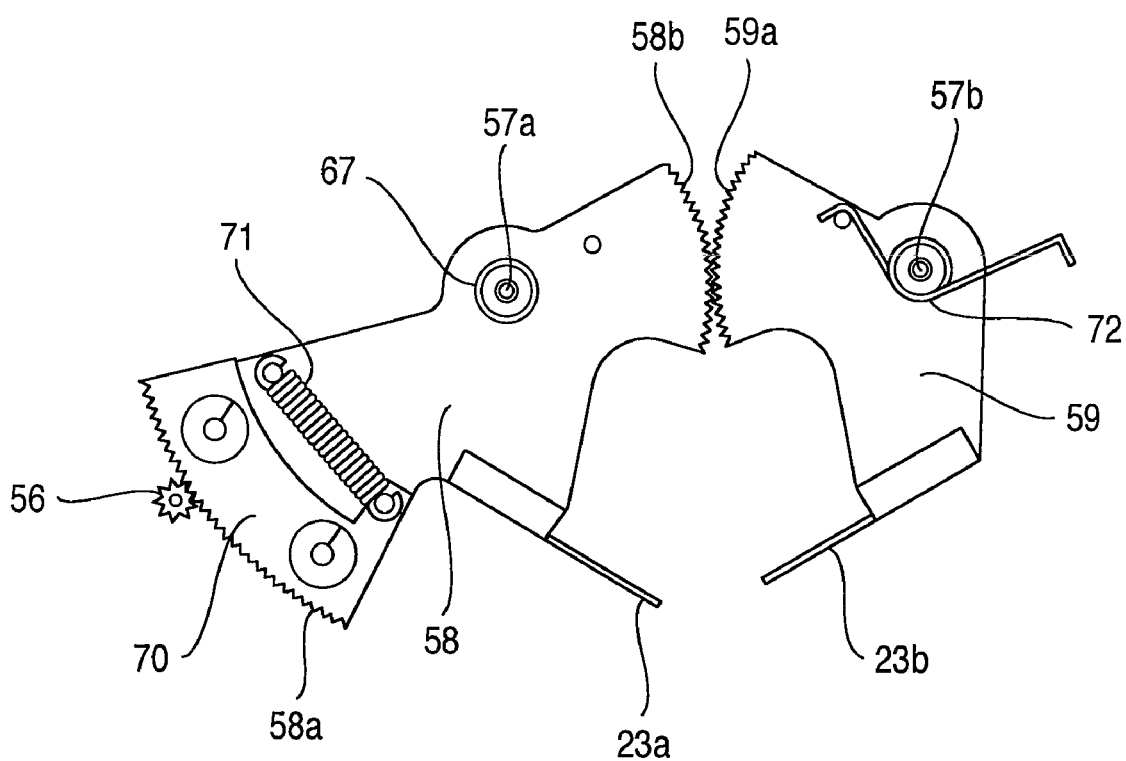
FIG. 4 is a diagram showing a gear train composition according to the embodiment 1.
Figure 5:
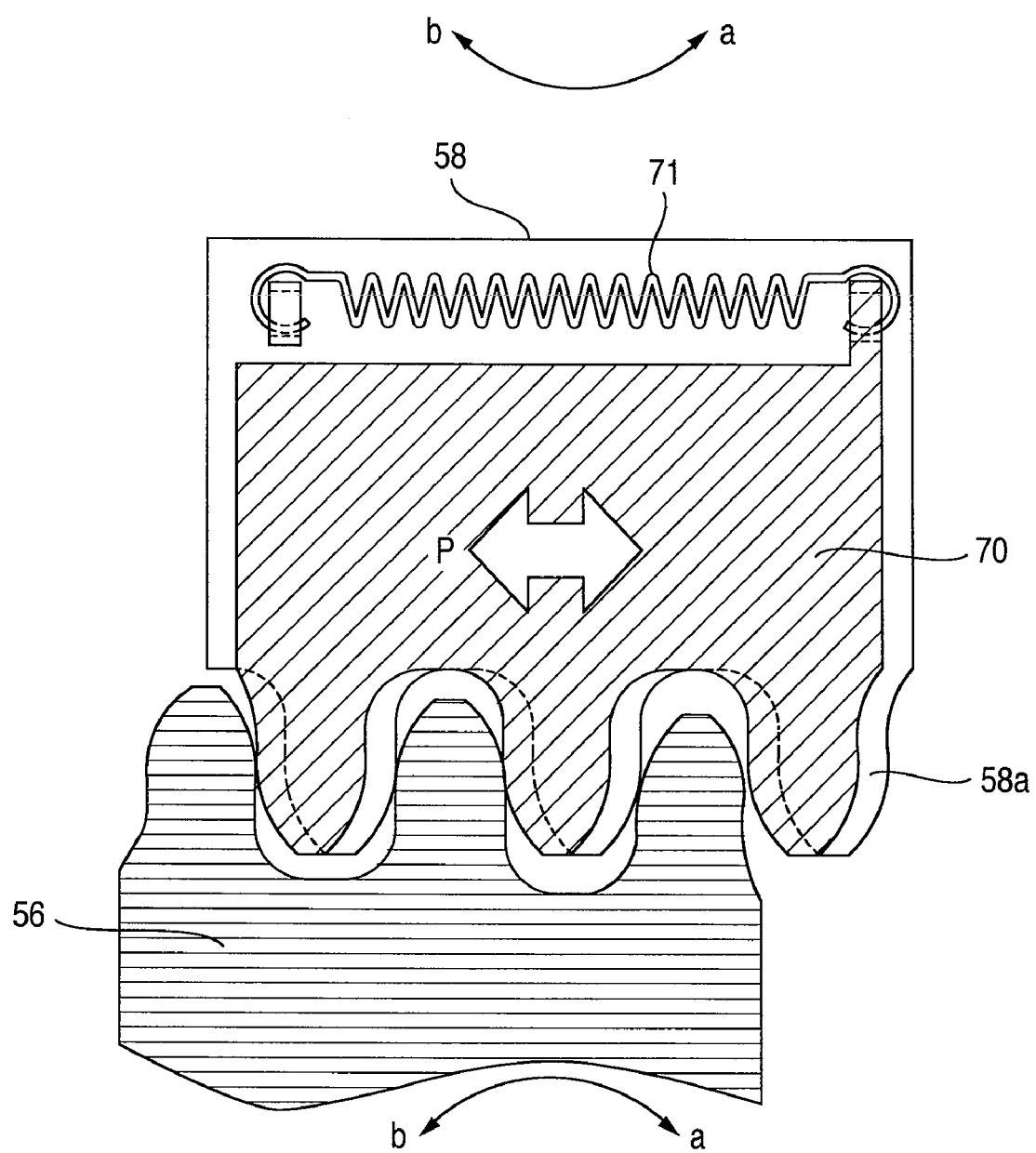
FIG. 5 is a magnified detailed diagram showing the mesh of the pinion gear 56 with the gear portion 58a of the light intercepting plate base A according to the embodiment 1.

Then, composition, which is characteristics of the present invention, is explained by referring to FIG. 4 and FIG. 5.

FIG. 4 is a diagram showing a gear train composition according to the present Example, and FIG. 5 is a magnified detailed diagram showing mesh of the pinion gear 56 with the gear portion 58a of the light intercepting plate base A. In FIG. 5, the pinion gear 56 turns around the center of the motor axis, and the light intercepting plate base A side also turns with the turning of the pinion gear 56. Namely, when the pinion gear 56 turns in a direction of "a", the light intercepting plate base A side also turns in a direction of "a", while when the pinion gear 56 turns in a direction of "b", the light intercepting plate base A side also turns in a direction of "a". As was described in FIG. 2, the gear portion 58a of the light intercepting plate base A 58 is arranged with the gear 70 to make 2-layer structure in superimposed way. In this way, the gear 70 is biased in a direction of the arrow mark "P" relative to the gear portion 58a of the light intercepting plate base A, by the coil spring 71 and composes a "scissors gear". Namely, the teeth of the pinion gear 56 are designed to be sandwiched by the teeth of the gear portion 58a of the light intercepting plate base A, and the teeth of the gear 70, under specified spring load.

In addition, the light intercepting plate base B59 is arranged with the torsion coil spring 72 coaxially with the turning axis thereof, and designed to be biased in a turning direction relative to the gear portion 59a of the light intercepting plate base B. Namely, the teeth of the gear of light intercepting plate base B and the teeth the gear of the light intercepting plate base A are biased to secure contact at the same position.

In the case that opening-closing of the light intercepting plate 23 is dynamically controlled by determination of suitable aperture amount in response to a luminescence signal of image input, output of the step motor 51 is transmitted to the light intercepting plate A 23a and the light intercepting plate B 23b. In this case, when a backlash is present between the pinion gear 56 coupled with the motor 51, and the gear 58a of the light intercepting plate A, and between the gear 58b of the light intercepting plate A, and the gear 59a of the light intercepting plate B, the knocking noise of the gears themselves is generated at the meshing portion of these gears. In particular, in the shift timing of the operation of the light intercepting plate 23 from an opening direction to a light intercepting direction, or from a light intercepting direction to an opening direction, namely in the timing of the turning direction of the step motor 51 is reversed, the noise is significantly generated. In particular, when a motor used as a driving unit is a step motor, even during driving in the same direction, the knocking noise of the gears themselves tends to be generated due to being step drive.

In the above description, a step motor is used, however, for example, a DC motor such as a pulse motor and a galvanic motor and the like or a servomotor also generates the similar knocking noise in reversed motion.

In general, in the case when driving force is transmitted by the gear train, the gear train teeth themselves may be contacted in the same direction by biasing them in a turning direction of the gear, by means of the torsion coil gear and the like. However, even in such a composition, the knocking noise inevitably generates in reversed motor operation, as long as there is inertia of a movable portion.

Namely, to suppress the generation of the knocking noise at the meshing portion of the gears even when abrupt motor reversion is repeated, the backlash at the meshing portion of the gears at the first step from the motor, which is a driving unit, should be reduced close to zero. In this case, the backlash can be reduced by adjustment of inter-axis distance of the gears themselves and finishing accuracy of the gears, however, the limitation thereof is present. In addition, elongation or contraction induced by temperature or variation in gear molding should be taken into consideration.

In the embodiments of the present invention, as shown in FIG. 5, a two-gears composition at the light intercepting plate A side is adopted, so as to secure zero backlash between the pinion gear 56 coupled with the first step from the driving unit, and the gear 58a of the light intercepting plate A 58, and such a composition is adopted that the teeth of the pinion gear 56 are sandwiched (scissors gear) by spring force of the coil spring 71. Specifically, such a composition is adopted that, for example, the gear 58a is abutted on one side surface of the channel of the pinion gear 56, and the gear 70 is abutted on the other side surface of the channel. By adoption of such a composition, because either of the gear 58a or the gear 70 is contacted with the pinion gear, the backlash can be reduced even in whichever direction the pinion gear turns. Further, the coil spring is installed so that each of the gear 58a and the gear 70 is biased in a direction abutting on the pinion gear 56.

Specifically, the gear 58a and the gear 70 are installed together in superimposing way to form a two step composition, and one end of the coil spring is coupled with the gear 58a and the other end of the coil spring is coupled with the gear 70.

The knocking noise caused by the meshing of the gear portions mainly generates at the first step portion from the driving unit, and therefore to reduce the knocking noise here is most effective for noise reduction. However, for further noise reduction, generation of the knocking noise by the gear should be suppressed, even at gear meshing portion at the second step. Therefore, the light intercepting plate B59 having the second step gear is installed with the torsion spring 72, and by biasing in the gear meshing direction, the noise reduction becomes possible. In the second step of the gear portion, biasing only to one side has sufficient effect, because inertia of the movable portion at the second or subsequent steps is small.

As described above, in the projection display equipped with a light source for illumination, optical aperture mechanism for partially intercepting light flux of illuminating light emitted from the light source, and a control circuit to adjust luminescence signal by setting optimal gain in response to a luminescence signal of image input, the noise reduction can be attained by adopting a composition of two gears at gear portion meshing with the pinion gear at the side of the motor, which is a driving unit of the optical aperture mechanism, at the first step, so that the gear part meshes with the pinion gear, and by generating spring force by arranging a spring between these 2 gears, and by adopting such a composition that the teeth of the pinion gear at the motor side are sandwiched (scissors gear) by the 2 gears and the spring.

In addition, in other specific embodiment of the projection display, the noise reduction can be attained by installment of a torsion coil spring at the meshing gear portion at the second step, for biasing in a turning direction, in the gear train for transmitting driving force from the motor of the optical aperture mechanism.

By adopting the composition, even in dynamic control of the optical aperture in response to an image signal, noise generated from the display can be suppressed to the minimum, and quality of the display can be improved.

The projection display, which is capable of improving contrast of image by installment of the optical aperture mechanism for dynamically adjusting light flux from light source in response to an input signal of image, is useful as the projection display used, in particular, in a home theater field, because it can suppress operation noise of the optical aperture mechanism to the minimum.

By means of the optical aperture for dynamically intercepting and controlling light flux of illuminating light emitted from light source for illumination, in response to a luminescence signal of image input, not only improvement of contrast characteristics of an image signal but also reduction of operation noise of the optical aperture can be possible.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A projection display comprising:
 a light source for emitting a light;
 an integrator for homogenizing the light from the light source;
 a light valve for modulating the light from the integrator;
 a projection lens for projecting the light modulated by the light valve; and an optical aperture unit arranged between the light source and the integrator, wherein the optical aperture unit comprises:

a first light intercepting plate and a second light intercepting plate, openable and closable, for partially intercepting the light from the light source, a motor for driving the first light intercepting plate and the second light intercepting plate, a pinion gear to be coupled with a motor axis of the motor, a first base to be coupled with the first light intercepting plate, and having a first gear abutting on a first side surface of a channel of the pinion gear a second gear abutting on a second side surface of a channel of the pinion gear and a third gear installed at a side surface different from said first and second gears, a second base to be coupled with the second light intercepting plate, and having a fourth gear meshing with the third gear, and a spring for biasing the first gear and the second gear each in a direction for abutting each of the first and second ears on the pinion gear, wherein the integrator is formed by a first and a second array lenses, the optical aperture unit is arranged between the first array lens and the second array lens, the first and second gears are superimposed, and the spring is a torsion coil spring, and one end thereof is coupled with the first gear and the other end thereof is coupled with the second gear.

2. The projection display according to claim 1, further comprising:

a compression spring coaxially with a turning axis of the first base; and covers on the first and second bases.

3. The projection display according to claim 2, wherein the motor is a step motor.

4. An optical aperture unit for intercepting a light, comprising:

a first light intercepting plate and a second light intercepting plate, openable and closable, for intercepting the light;

a motor for driving the first light intercepting plate and the second light intercepting plate;

a pinion gear to be coupled with a motor axis of the motor;

a first base to be coupled with the first light intercepting plate, and having a first gear abutting on a first side surface of a channel of the pinion gear, a second gear abutting on a second side surface of a channel of the pinion gear and a third gear installed at a side surface different from the first and second gears;

a second base to be coupled with the second light intercepting plate, and having a fourth gear meshing with the third gear; and a spring for biasing the first gear and the second gear each in a direction for abutting each of the first and second gears on the pinion gear, wherein the first gear and the second gear are placed in superimposed way, and the spring is a torsion coil spring, and one end thereof is coupled with the first gear, and the other end thereof is coupled with the second gear.

5. The optical aperture unit according to claim 4, further comprising:

a compression spring coaxially with a turning axis of the first base; and covers on the first and second bases.

6. The projection display according to claim 5, wherein the motor is a step motor.

* * * * *